(12) United States Patent
Lemelin

(10) Patent No.: US 7,638,567 B2
(45) Date of Patent: Dec. 29, 2009

(54) ABRASION RESISTANT COMPOSITES

(75) Inventor: Luc-Lin Lemelin, Sherbrooke (CA)

(73) Assignee: American Biltrite (Canada) Ltd., Sherbrooke, Quebec (CA)

(*) Notice: Subject to any disclaimer, the term of this patent is extended or adjusted under 35 U.S.C. 154(b) by 0 days.

(21) Appl. No.: 12/359,650

(22) Filed: Jan. 26, 2009

(65) Prior Publication Data

US 2009/0133991 A1      May 28, 2009

Related U.S. Application Data

(63) Continuation of application No. 11/599,164, filed on Nov. 13, 2006, now abandoned.

(60) Provisional application No. 60/736,076, filed on Nov. 11, 2005.

(51) Int. Cl.
*B60C 1/00*       (2006.01)

(52) U.S. Cl. ............... 524/261; 524/526; 524/574; 524/575.5; 428/492

(58) Field of Classification Search .......... 524/261, 524/526, 574, 575.5; 428/492
See application file for complete search history.

(56) References Cited

U.S. PATENT DOCUMENTS

| | | | | |
|---|---|---|---|---|
| 2002/0062894 | A1* | 5/2002 | Miner et al. | 152/517 |
| 2004/0092644 | A1* | 5/2004 | Labauze | 524/492 |

* cited by examiner

*Primary Examiner*—Bernard Lipman
(74) *Attorney, Agent, or Firm*—Chaote, Hall & Stewart LLP

(57) ABSTRACT

In various embodiments, the present inventions provide a rubber composite having an abrasion resistance better than about 125 $mm^3$ under DIN 53516 and comprising a natural rubber, between about 15 to about 25 parts per hundred rubber (PHR) of a butadiene, between about 20 to about 40 PHR of a silica; and between about 0.4 to about 4 PHR of an organosilane polysulfur cross-linking agent. Also provided in various embodiments are multiply rubber materials having a first ply of the above composite and a second thinner ply of a styrene-butadiene rubber.

28 Claims, No Drawings

ABRASION RESISTANT COMPOSITES

CROSS-REFERENCE TO RELATED APPLICATIONS

The present application claims the benefit of and priority to copending U.S. application Ser. No. 11/599,164, filed Nov. 13, 2006 and provisional application No. 60/736,076 filed Nov. 11, 2005, the entire contents of both applications is herein incorporated by reference.

BACKGROUND OF THE INVENTION

Abrasion resistant rubbers find application in a variety of fields. For example, in mining operations, they may be used to extend the life of metal transport chutes on conveyors. Such transporter chute life extension can be critical to economical mining operations. Repairing or replacing conveyor chutes can immediately bring material transport, and hence mining operations, to a halt. Accordingly, extending the lifetime of conveyor systems, and the time between repair or maintenance shut downs down, is of great value to the mining industry.

SUMMARY OF THE INVENTION

The present inventions pertain to particle-reinforced rubber composites, and in particular, to rubber composites that confer abrasion resistance. In various embodiments, provided are composites having an abradability value, measured according to DIN 53516, of less than about 125 mm$^3$.

Various embodiments of the present inventions can be used, for example, in the mining, cement, concrete and aggregate sectors in applications where abrasion resistance is critical. Examples of possible applications, include, but are not limited to, use as a lining material to protect surfaces handling abrasive material such as for chutes, hoppers, cyclones, pipes, elbows, tanks, collectors, truck bins, silos, vibrators, etc.; use as and/or on conveyor belt skirting and scrapers; use as and/or on pulley lagging; use as and/or on Sand blasting curtains; etc., and in general on any application that involves transfer of dry or wet abrasive material.

In various aspects, the present inventions provide a rubber composite comprising a natural rubber, between about 15 to about 25 parts per hundred rubber (PHR) of a butadiene, between about 20 to about 40 PHR of a silica; and between about 0.4 to about 4 PHR of an organosilane polysulfur cross-linking agent. The composite can include, for example, one or more conventional additives, including but not limited to curing agents (e.g., vulcanization activators, vulcanization accelerators, etc.), antiozonants, antioxidants, plasticizers, lubricants, anti-stick agents, working adjuvants, age-retarding agents, flame retardants, colorants, etc.

In various embodiments, such a rubber composite has a resistance to abrasion according to the DIN 53516 standard of less than about 125 mm$^3$. More abrasion resistant composites are also obtainable in various embodiments of the present inventions including, but not limited to, composites having a resistance to abrasion according to the DIN 53516 standard that is equal to or less than about one or more of: (a) 120 mm$^3$; (b) 110 mm$^3$; and/or (c) 105 mm$^3$. In various embodiments, a composite has a resistance to abrasion according to the NBS standard of greater than about 115%.

In addition to abrasion resistance, in various embodiments, the composites of the present inventions have one or more of the following properties: (a) a hardness of greater than about 35 on the Durometer Scale A when measured according to ASTM D2240; (b) a tensile strength of greater than about 3100 pounds per square inch (psi) when measured according to ASTM D412; (c) a tear strength using Die C of greater than about 265 pounds per linear inch (pli) when measured according to ASTM D624; (d) a modulus 100% of greater than about 140 pounds per square inch (psi) when measured according to ASTM D412; (e) a modulus 300% of greater than about 500 psi when measured according to ASTM D412; (f) an elongation of greater than about 675% when measure by ASTM D412; and (g) an elongation of greater than about 725% when measure by ASTM D412.

In various embodiments, the rubber composites of the present invention comprise between about 15 to about 25 PHR of a plasticizer. Examples of suitable plasticers include napthenic oils (e.g., Circo oil).

In various aspects, the provided are multiply rubber materials, said materials comprising a first ply and a second ply. The first ply comprising a natural rubber; between about 20 to about 40 PHR silica; and between about 0.4 to about 4 PHR organosilane polysulfur cross-linking agent; and the second ply comprising a styrene-butadiene rubber. In various embodiments, the ratio of the thickness of the first ply to the second ply is in the range between about 3:1 to about 15:1.

In various embodiments, the first ply has a resistance to abrasion according to the DIN 53516 standard of less than about 125 mm$^3$. More abrasion resistant first plies are also obtainable in various embodiments of the present inventions including, but not limited to, composites having a resistance to abrasion according to the DIN 53516 standard that is equal to or less than about one or more of: (a) 120 mm$^3$; (b) 110 mm$^3$; and/or (c) 105 mm$^3$. In various embodiments, the first ply has a resistance to abrasion according to the NBS standard of greater than about 115%. In addition to abrasion resistance, in various embodiments, the first ply has one or more of the following properties: (a) a hardness of greater than about 35 on the Durometer Scale A when measured according to ASTM D2240; and (b) a tear strength using Die C of greater than about 265 pounds per linear inch (pli) when measured according to ASTM D624;

In addition to the abrasion resistance, hardness or both of the first ply, in various embodiments, multiply rubber materials of the present inventions have one or more of the following properties: (a) a tensile strength of greater than about 3100 pounds per square inch (psi) when measured according to ASTM D412; (b) a modulus 100% of greater than about 140 pounds per square inch (psi) when measured according to ASTM D412; (c) a modulus 300% of greater than about 500 psi when measured according to ASTM D412; (d) an elongation of greater than about 600% when measure by ASTM D412; and (e) an elongation of greater than about 675% when measure by ASTM D412.

In various embodiments, the first ply of the multiply rubber materials of the present invention comprise between about 15 to about 25 PHR of a plasticizer. Examples of suitable plasticizers include napthenic oils (e.g., Circo oil, and TCR, HTDS, Naphspec, and Solspec rubber processing oils available from Tribospec Corp., Lasalle, Quebec).

The first ply, second ply, or both can include one or more conventional additives including, but not limited to, curing agents (e.g., vulcanization activators, vulcanization accelerators, etc.), antiozonants, antioxidants, plasticizers, lubricants, anti-stick agents, working adjuvants, age-retarding agents, flame retardants, colorants, etc.

In various aspects, the present inventions provide composites comprising a vulcanized rubber matrix of about 50-60 weight percent natural rubber, about 20-40 weight percent butadiene, about 10-40 weight percent silica and with about 0.2-2 weight percent of an organosilane polysulfur cross-linking agent. The composite can include, for example, one or more conventional additives, including but not limited to curing agents (e.g., vulcanization activators, vulcanization accelerators, etc.), antiozonants, antioxidants, plasticizers, lubricants, anti-stick agents, working adjuvants, age-retarding agents, flame retardants, colorants, etc. In various embodiments, such a rubber composite has a resistance to abrasion according to the DIN 53516 standard of less than about 125 mm$^3$. More abrasion resistant composites are also obtainable in various embodiments of the present inventions including, but not limited to, composites having a resistance to abrasion according to the DIN 53516 standard that is equal to or less than about one or more of: (a) 120 mm$^3$; (b) 110 mm$^3$; and/or (c) 105 mm$^3$. In various embodiments, a composite has a resistance to abrasion according to the NBS standard of greater than about 115%.

DETAILED DESCRIPTION OF VARIOUS EMBODIMENTS

The present inventions provide, rubber compositions and rubber materials that comprise at least a silica-based reinforcing filler, a natural rubber and butadiene polymeric base, and a suitable organosilane polysulfur cross-linking agent capable of chemically reacting with silica and of binding the latter to the polymeric base during the vulcanization of the same.

In various embodiments, the composite includes a vulcanized rubber matrix of natural rubber, about 15 to about 25 parts per hundred rubber (PHR) of a butadiene, about 20 to about 40 PHR of a silica, and about 0.4 to about 4 PHR of an organosilane polysulfur cross-linking agent.

In various embodiments, the composite includes a vulcanized rubber matrix of about 50-60 weight percent natural rubber, about 20-40 weight percent butadiene and with about 10-40 weight percent silica and with about 0.2-2 weight percent of an organosilane polysulfur cross-linking agent.

In various aspects, the present invention provides a multi-ply rubber material comprising a first ply and a second ply. The first ply comprising a natural rubber, about 15 to about 25 parts per hundred rubber (PHR) of a butadiene, about 20 to about 40 PHR of a silica, and about 0.4 to about 4 PHR of an organosilane polysulfur cross-linking agent and the second ply comprising a styrene-butadiene rubber.

Butadiene and Styrene-Butadiene

As used herein, the term "butadiene" refers to an agent based on butadiene, such as butadiene, polybutadiene and mixtures thereof. Preferably, the butadiene comprises a high 1,4-cis form of polybutadiene, such as, for example, Taktene™ 1220 and/or Taktene™ 220 (available from Bayer Corp., Pittsburgh, Pa.). Other butadiene's suitable for various embodiments include butadiene-acrylonitrile, styrene-butadiene and styrene-butadiene-isoprene terpolymers.

In various aspects, the present inventions provide a multi-ply rubber having a styrene-butadiene rubber ply. A wide variety of styrene-butadiene rubbers can be used, such rubbers being selected, for example, based on their styrene content and viscosity prior to curing. In various embodiments, the styrene-butadiene rubber has a styrene content in the range between about 20 weight % to about 35 weight %; and a precure Mooney viscosity (e.g., according to ASTM 1646) in the range between about 50 to about 60. In various embodiments, the styrene-butadiene rubber also has a specific gravity in the range between about 1.05 to about 1.15; a Duro (scale A) in the range between about 50 to about 60, or both.

Silica

As used herein, the term "silica" refers to an agent based on silicon dioxide (silica), silicates and mixtures thereof. The term silica is used for conciseness of description only and should not be construed to limit the description or claims to silicon dioxide only.

In various embodiments, the silica can be in the form of particles having a size between about 10 nm and about 20 microns. In various embodiments, the silica particles have a size between, about 10 nm and about 20 nm. In various embodiments, the silica is in the form of flakes. Silica (both particles and flakes) can also be characterized by their BET surface area. Preferred silicas, for use in the present inventions, have a surface area, as measured according to the BET method, in the range between about 125 to about 195 m$^2$/g. In various embodiments, preferred silicas have a BET surface area in the range between about 125 to about 150 m$^2$/g.

Various commercially available silicas can be used for various embodiments of the inventions, for example, silicas commercially available from PPG Industries under the Hi-Sil trademark with designations 210, 243, etc; silicas available from Rhone-Poulenc, with, for example, designations of Z1165 MP and Z165GR and silicas available from Degussa AG with, for example, designations VN2 and VN3, etc. In various embodiments, Hi-Sil 243 LD is preferred.

Cross-Linking Agent

As used herein, the terms "cross-linking agent" and "coupling agent" are used interchangeably to refer to an agent capable of chemically reacting with silica and of binding the latter to the polymeric base (natural rubber and a butadiene) during vulcanization. Examples of suitable organosilane polysulfur cross-linking agents include, but are not limited to, 3,3'-bis(triethoxysilylpropyl) tetrasulfide, and bis(triethyoxysilylpropyl) bisulfide, bis(triethyoxysilylpropyl) polysulfide.

Various commercially available organosilane polysulfur cross-linking agents can be used for various embodiments of the inventions, for example, Silane S169® and Silane SI 75® available from Degussa AG.

Vulcanization, Plasticizers & Additives

In various preferred embodiments, the rubber composites of the present inventions include one or more plasticizers or additives, in addition to the polymeric base, silica, and cross-linking agent, to facilitate imparting various properties to the resultant rubber as well as mechanical and workability characteristics of the composite. Examples of suitable plasticizers include napthenic oils (e.g., Circo oil, and TCR, HTDS, Naphspec, and Solspec rubber processing oils (RPO) available from Tribospec Corp., Lasalle, Quebec). Examples of additives include, but are not limited to, vulcanization activators, vulcanization accelerators, curing agents lubricants, anti-stick agents, working adjuvants, antioxidants (e.g., octylated diphenylamine), antiozonants (including protective waxes, such as, e.g., polyethylene glycol), age-retarding agents, flame-retarding agents, colorants (e.g., Irgalite® Red 2BP from Ciba Specialty Chemicals for a red coloration), etc.

The rubber composites of the present inventions are made vulcanizable by adding a suitable vulcanizing agent, preferably together with suitable vulcanization activators and accelerators. Preferred vulcanizing agents are sulphur and sulphur-containing molecules (sulphur donors). Among vulcanization activators, zinc stearate, which can be added and/or formed directly in the rubber composition by adding zinc oxide and stearic acid, is preferred. Examples of suitable accelerators include, but are not limited to: guanidines (preferably substantially nitrosamine-free) including diorthotolyl guanidine; 2,2'-dithiobis(benzothaizole), and 2-(Morpholinothio) benzothaizole.

SBR Second Ply

In various aspects, the present inventions provide a multi-ply rubber material having a first ply and second ply of a styrene-butadiene rubber. The second ply is cured with the first ply to make the multiply rubber material. A wide variety of styrene-butadiene rubbers can be used for the second ply, such rubbers being selected, for example, based on their styrene content and viscosity prior to curing. In various embodiments, the styrene-butadiene rubber has a styrene content in the range between about 20 weight % to about 35 weight %; and a precure Mooney viscosity (e.g., according to ASTM 1646) in the range between about 50 to about 60. In various embodiments, the styrene-butadiene rubber also has a specific gravity in the range between about 1.05 to about 1.15; a Duro (scale A) in the range between about 50 to about 60, or both. Preferably, the second ply has a thickness that is between about ⅓rd to about ⅟₁₅th as thick as the first ply.

The second ply can be used, e.g., to facilitate buffing the multiply rubber and provide a better surface for attachment of the material, e.g., as a lining to protect surfaces handling abrasive material. For example, the second ply can be buffed and coated with an adhesive and bonded to a surface; the buffing providing a greater surface area for bonding. The first ply, being cured with, and hence bonded to, the second ply is held to the surface by the second ply, but the first ply (having increased abrasion resistance and hence being harder to buff) is presented to the abrasive material being handled.

Preparation

The composites of the present inventions can be produced using rubber processing techniques known to those skilled in the art using standard rubber processing equipment. For example, a wide variety of machines and methods can be used to mix the ingredients, such as open mills, internal mixers, etc. A wide variety of machines and methods can be used to cure the compositions, including but not limited to, a double band press, a rotary curing press (e.g., rotocure), etc.

EXAMPLES

Aspects of the present inventions may be further understood in light of the following examples, which are not exhaustive and which should not be construed as limiting the scope of the present inventions in any way.

In the Examples the ingredients of a composition are in units of parts per hundred rubber (PHR). Table 1 lists the ingredients and the amounts mixed to form the various composite of the present examples. The first column of Table 1 lists the common tradename of the ingredient used, if any, or the type of compound (e.g., accelerator), columns 2-5 lists the amount used, in units of PHR, for various composites of the invention, and column 6 lists the reported primary component or general purpose of the ingredient.

TABLE 1

| Ingredient | PHR | | | | Primary Component |
|---|---|---|---|---|---|
| Natural Rubber SVR 10CV60 | 75 | 80 | 85 | 85 | Cis-1,4 polyisopropene |
| Taktene 1220 | 25 | 20 | 15 | 15 | Polybutadiene, (high cis-1,4 form) |
| Hi-Sil ® 243 LD | 40 | 30 | 20 | 40 | Hydrated, amorphous silica ($SiO_2$) |
| Circo Oil | 30 | 20 | 15 | 20 | [plasticizer] |
| Silane SI 69 ® | 0.5 | 1 | 2 | 1.5 | Bis (triethyoxysilylpropyl)polysulfide |
| activators | 8 | 8 | 8 | 8 | [activator] |
| accelerators | 2.25 | 2.25 | 2.25 | 2.25 | [accelerator] |
| antiozanant | 1.5 | 1.5 | 1.5 | 1.5 | [antiozanant] |
| sulphur | 1.5 | 1.5 | 1.5 | 1.5 | sulphur |
| antioxidant | 1 | 1 | 1 | 1 | [antioxidant] |
| red colorant | 0.4 | 0.4 | 0.4 | 0.4 | [colorant] |

The ingredients of Table 1 are available from a number of chemical manufacturers and distributors; examples of suppliers and/or manufacturers of the ingredients include, but are not necessarily limited to: Natural Rubber SVR 10CV60 (RCMA Americas, Inc., Norfolk, Va.); Taktene 1220 (a trademark of and available from Lanxess, Sarnia, Ontario, formerly Bayer Corp., Pittsburgh, Pa.); Hi-Sil® 243 LD (a trademark of and manufactured by PPG Industries, Inc., Pittsburgh, Pa.); Circo Oil (commonly available); and Silane S169® (a trademark of and manufactured by Degussa, AG, Parsippany, N.J.).

As is understood by those of ordinary skill in the art, a wide variety of types and grades of sulphur and of activators, accelerators, antiozanants, antioxidants, colorants, etc. that are available and usable in the present inventions and are available under a variety of tradenames. The exact proportions of the sulphur and these additives being selected based on principles known to the art.

Example 1

Rubber Composites

Composites of Table 1 can be processed in a variety of thicknesses. The results of Table 2 are for a composite substantially according to the formulation of column 3 of Table 1 which was processed in two thickness, an about 0.26 inch-thick sample and an about 0.49 inch-thick sample; these samples are referred to herein, respectively, as Sample 1 and Sample 2.

Samples 1 and 2 were produced by mixing the ingredients of column 3 of Table 1 using methods know in the art and curing the samples using a double band press. The curing conditions were substantially as follows with slight variations due to variations in sample thickness, the temperature of the upper and lower rolls on entry was about 200 degrees Fahrenheit (° F.), temperature of the upper and lower rolls on exit was about 235° F., the set point temperature of the oil for the press was about 300° F., and the temperature of the platen was about 312° F. The press pressure was about 165 bars and the material feed rate was about 0.65 feet per minute. The temperature measurements are generally considered accurate to within ±5° F. The composites of the other formulations, columns 2, 4 and 5, of Table 1, can also be processed substantially as described above.

The properties of the resultant Sample 1 and Sample 2 are listed in Table 2. A resistance to abrasion for Sample 2 using the DIN 53516 standard was not taken, but it is believed to be have an abrasion resistance comparable to or better than Sample 1 based upon a comparison of the NBS abrasion measurements.

TABLE 2

| Sample | Sample 1 | Sample 2 |
|---|---|---|
| Dimension | 0.260" × 48" | 0.490" × 48" |
| Total Thickness (in) | 0.260" | 0.490" |
| Number of plies | 1 | 1 |
| Face ply Color Finish | Red Smooth | Red Smooth |
| Back ply Color Finish | Red Smooth | Red Smooth |
| Density (g/cc) | 1.06 | 1.06 |
| Hardness (Durometer Scale A) | 40 | 42 |
| Tensile Strength (psi) | 3380 | 3170 |
| Modulus 100% (psi) | 150 | 170 |
| Modulus 300% (psi) | 510 | 590 |
| Elongation (%) | 750 | 690 |
| Tear Strength, Die C (pli) | 280 | 270 |
| Abrasion NBS (%) | 130 | 120 |
| Abrasion DIN 53516 ($mm^3$) | 108 | N/T |

The material properties where measured substantially in accord with the following standards. Hardness is according to Durometer Scale A and was measured in accord with ASTM D2240. Tensile strength, modulus 100% and modulus 300% (also referred to as tensile stress of 100% elongation and 300% elongation, respectively), were all measured in accord with ASTM D412 and values are given in pounds per square inch (psi). Elongation percentage was measured in accord with ASTM D412. Tear strength, was measured using Die C in accord with ASTM D624 and values are given in units of pounds per linear inch (pli). Abrasion resistance was measured using two different standard methods, NBS and DIN 53516.

Example 2

Multiply

A multiply rubber material can be made using a first ply having the ingredients of a composition of Table 1 and a second ply comprising a styrene-butadiene rubber. In on example of such a multiply rubber material, the first and second plies were cured together in a rotary press (rotocure) under the following conditions. Temperature Zones 1-4 were, respectively, about 300° F., about 600° F., about 675° F., and about 700° F. The zone temperature measurements are generally considered accurate to within ±10° F. The temperature of the drum was about 305° F. and the drum oil about 295° F.; these temperature measurements generally being considered accurate to within ±5° F. The belt pressure was about 2500±200 psi.

In this example, the first ply was about 0.475 inches thick and the second ply about 0.04 inches thick. The first and second ply were brought into the press together and fed at a rate of about 0.5 feet per minute. The plies were each about 56 inches wide and 350 inches long. The cycle time for cure was about 22.6 minutes. Upon entering the press, the combined thickness of the first and second plies was about 0.535 inches (including a 0.037 inch thick nylon (39 picks, 203 $g/m^2$) impressed upon the second ply subsequently removed after curing) and the multiply rubber material after curing (upon departure from the press) was about 0.5 inches thick. The formulation and material properties of the first ply were substantially similar to those listed for Sample 2 in Example 1.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art.

While the inventions have been particularly shown and described with reference to specific illustrative embodiments, it should be understood that various changes in form and detail may be made without departing from the spirit and scope of the present inventions. Therefore, all embodiments that come within the scope and spirit of the present inventions, and equivalents thereto, are claimed.

What is claimed is:

1. A method comprising
   conveying an abrasive solid material or slurry through a material conveyance equipment lined with a rubber composition comprising
   a natural rubber;
   between about 15 to about 25 parts per hundred rubber (PHR) butadiene;
   between about 20 to about 40 PHR silica;
   between about 0.4 to about 4 PHR organosilane polysulfur cross-linking agent;
   between about 15 to about 25 PHR of a plasticizing oil.

2. The method of claim 1, wherein the rubber composition has a resistance to abrasion of less than about 125 $mm^3$ when measured according to DIN 53516.

3. The method of claim 1, wherein the rubber composition has a tensile strength of greater than about 3100 pounds per square inch (psi) when measured according to ASTM D412.

4. The method of claim 2, wherein the rubber composition has a hardness of greater than about 35 on the Durometer Scale A when measured according to ASTM D2240.

5. The method of claim 1, wherein rubber composition has a resistance to abrasion of less than about 110 $mm^3$ when measured according to DIN 53516.

6. The method of claim 1, wherein the plasticizing oil comprises a naphthenic oil.

7. The method of claim 1, wherein the butadiene comprises a high cis form of 1,4 polybutadiene.

8. The method of claim 1, wherein the silica has a BET surface area in the range between about 125 to about 150 $m^2/g$.

9. The method of claim 1, wherein the organosilane polysulfur cross-linking agent comprises bis(triethoxysilylpropyl)polysulfide.

10. A method comprising,
storing a material in a material storage equipment lined with a rubber composition comprising
a natural rubber;
between about 15 to about 25 parts per hundred rubber (PHR) butadiene;
between about 20 to about 40 PHR silica;
between about 0.4 to about 4 PHR organosilane polysulfur cross-linking agent;
between about 15 to about 25 PHR of a plasticizing oil.

11. The method of claim 10 wherein the rubber composition has a resistance to abrasion of less than about 125 mm$^3$ when measured according to DIN 53516.

12. The method of claim 10 wherein the rubber composition has a tensile strength of greater than about 3100 pounds per square inch (psi) when measured according to ASTM D412.

13. The method of claim 10 wherein the rubber composition has a hardness of greater than about 35 on the Durometer Scale A when measured according to ASTM D2240.

14. The method of claim 10 wherein rubber composition has a resistance to abrasion of less than about 110 mm$^3$ when measured according to DIN 53516.

15. The method of claim 10 wherein the plasticizing oil comprises a naphthenic oil.

16. The method of claim 10 wherein the butadiene comprises a high cis form of 1,4 polybutadiene.

17. The method of claim 10 wherein the silica has a BET surface area in the range between about 125 to about 150 m$^2$/g.

18. The method of claim 10, wherein the organosilane polysulfur cross-linking agent comprises bis(triethoxysilylpropyl)polysulfide.

19. A method comprising
conveying an abrasive solid material or slurry through a material conveyance equipment lined with a rubber composition comprising
a multiply rubber material, comprising:
a first ply, the first ply comprising
a natural rubber;
between about 15 to about 25 parts per hundred rubber (PHR) butadiene;
between about 20 to about 40 PHR silica;
between about 0.4 to about 4 PHR organosilane polysulfur cross-linking agent; and
between about 15 to about 25 PHR of a plasticizing oil; and
a second ply, the second ply comprising a styrene-butadiene rubber.

20. The rubber material of claim 19, wherein the ratio of the thickness of the first ply to the second ply is in the range between about 3:1 to about 15:1.

21. The method of claim 19 wherein the rubber composition has a resistance to abrasion of less than about 125 mm$^3$ when measured according to DIN 53516.

22. The method of claim 19 wherein the rubber composition has a tensile strength of greater than about 3100 pounds per square inch (psi) when measured according to ASTM D412.

23. The method of claim 19 wherein the rubber composition has a hardness of greater than about 35 on the Durometer Scale A when measured according to ASTM D2240.

24. The method of claim 19 wherein rubber composition has a resistance to abrasion of less than about 110 mm$^3$ when measured according to DIN 53516.

25. The method of claim 19 wherein the plasticizing oil comprises a naphthenic oil.

26. The method of claim 19 wherein the butadiene comprises a high cis form of 1,4 polybutadiene.

27. The method of claim 19 wherein the silica has a BET surface area in the range between about 125 to about 150 m$^2$/g.

28. The method of claim 19, wherein the organosilane polysulfur cross-linking agent comprises bis(triethoxysilylpropyl)polysulfide.

* * * * *